(12) United States Patent
Muller et al.

(10) Patent No.: US 8,193,125 B2
(45) Date of Patent: Jun. 5, 2012

(54) CROSSLINKED GLYCEROL OR OLIGOGLYCEROL ESTERS, AND USE THEREOF AS AN ADDITIVE IN DRILLING FLUIDS

(75) Inventors: Heinz Muller, Monheim (DE); Diana Maker, Monheim (DE); Nadja Herzog, Korschenbroich (DE); Alfred Westfechtel, Hilden (DE)

(73) Assignee: Emery Oleochemicals GmbH, Dusseldorf (DE)

( * ) Notice: Subject to any disclaimer, the term of this patent is extended or adjusted under 35 U.S.C. 154(b) by 0 days.

(21) Appl. No.: 12/866,492

(22) PCT Filed: Feb. 6, 2009

(86) PCT No.: PCT/EP2009/051401
§ 371 (c)(1),
(2), (4) Date: Sep. 15, 2010

(87) PCT Pub. No.: WO2009/098308
PCT Pub. Date: Aug. 13, 2009

(65) Prior Publication Data
US 2011/0011645 A1   Jan. 20, 2011

(30) Foreign Application Priority Data
Feb. 8, 2008   (DE) .................. 10 2008 008 251

(51) Int. Cl.
*C09K 8/04* (2006.01)
*C09K 8/035* (2006.01)

(52) U.S. Cl. .......... 507/138; 507/136; 507/904; 516/53; 516/72; 516/73; 554/227

(58) Field of Classification Search .................. 507/138, 507/136, 904; 516/53, 72, 73; 554/227
See application file for complete search history.

(56) References Cited

U.S. PATENT DOCUMENTS

| | | | |
|---|---|---|---|
| 4,614,604 A | 9/1986 | Helfert et al. | |
| 5,232,910 A | 8/1993 | Mueller et al. | |
| 5,252,554 A | 10/1993 | Mueller et al. | |
| 5,254,531 A | 10/1993 | Mueller et al. | |
| 5,318,954 A | 6/1994 | Mueller et al. | |
| 5,318,956 A | 6/1994 | Mueller et al. | |
| 5,348,938 A | 9/1994 | Mueller et al. | |
| 5,403,822 A | 4/1995 | Mueller et al. | |
| 5,441,927 A | 8/1995 | Mueller et al. | |
| 5,461,028 A | 10/1995 | Mueller et al. | |
| 5,663,122 A | 9/1997 | Mueller et al. | |
| 5,755,892 A | 5/1998 | Herold et al. | |
| 5,846,601 A | 12/1998 | Ritter et al. | |
| RE36,066 E | 1/1999 | Mueller et al. | |
| 5,869,434 A | 2/1999 | Mueller et al. | |
| 6,022,833 A | 2/2000 | Mueller et al. | |
| 6,122,860 A | 9/2000 | Von Tapavicza et al. | |
| 6,165,946 A | 12/2000 | Mueller et al. | |
| 6,289,989 B1 | 9/2001 | Mueller et al. | |
| 6,350,788 B1 | 2/2002 | Herold et al. | |
| 6,716,799 B1 | 4/2004 | Mueller et al. | |
| 6,806,235 B1 | 10/2004 | Mueller et al. | |
| 6,884,762 B2 | 4/2005 | Breeden et al. | |
| 7,666,820 B2 | 2/2010 | Mueller et al. | |
| 7,741,248 B2 | 6/2010 | Mueller et al. | |
| 2004/0248746 A1 | 12/2004 | Matsui | |
| 2006/0094805 A1 | 5/2006 | Heinrichs | |
| 2007/0219097 A1 | 9/2007 | Mueller et al. | |
| 2008/0110083 A1 | 5/2008 | Baehr et al. | |
| 2008/0234145 A1 | 9/2008 | Mueller et al. | |
| 2010/0048931 A1 | 2/2010 | Westfechtel et al. | |
| 2010/0168255 A1 | 7/2010 | Westfechtel et al. | |
| 2010/0179346 A1 | 7/2010 | Klein et al. | |

FOREIGN PATENT DOCUMENTS

| | | |
|---|---|---|
| CN | 1966561 A | 5/2007 |
| DE | 4018228 A1 | 12/1991 |
| DE | 10245623 A1 | 4/2004 |
| DE | 102004042738 A1 | 3/2006 |
| EP | 0064697 A1 | 11/1982 |
| EP | 0374671 A1 | 6/1990 |
| EP | 0374672 A1 | 6/1990 |
| EP | 0382701 A1 | 8/1990 |
| EP | 0765368 A1 | 4/1997 |
| EP | 0787706 A1 | 8/1997 |
| JP | 2006047656 A * | 2/2006 |
| WO | 9534610 A1 | 12/1995 |

OTHER PUBLICATIONS

Machine translation of Japaneses patent document JP2006-047656.*
Database WPI Week 200618, Abstract, copyright May 6, 2009, Thompson Scientific London, GB, AN 2006-168490, XP002526159, JP 2006047656A (Ricoh KK).

(Continued)

*Primary Examiner* — Timothy J. Kugel
(74) *Attorney, Agent, or Firm* — Smith Moore Leatherwood LLP; Philip P. McCann

(57) ABSTRACT

The present invention relates to a crosslinked glycerol or oligoglycerol ester which can be obtained by crosslinking a non-crosslinked glycerol or oligoglycerol ester which can be obtained by reacting an
(A) acid phase comprising
  (a1) a fatty acid,
  (a2) a dicarboxylic acid,
  (a3) a dimeric fatty acid,
  (a4) an oligomeric fatty acid,
  (a5) a hydroxy fatty acid or
  (a6) a mixture of at least two thereof,
with a
(B) alcohol phase comprising
  (b1) monoglycerol,
  (b2) diglycerol,
  (b3) triglycerol,
  (b4) oligoglycerol made up of more than three glycerol units,
  (b5) an alkoxylate of glycerols (b1), (b2), (b3) or (b4), or
  (b6) a mixture of at least two thereof,
forming a full or partial ester and crosslinking the full or partial ester by means of a crosslinking agent, wherein the crosslinking can take place during or after the formation of the full or partial ester.

17 Claims, 1 Drawing Sheet

OTHER PUBLICATIONS

Database WPI Week 200767, Abstract, copyright May 6, 2009, Thompson Scientific, London, GB, AN 2007-709882, XP002526158, CN 1966561A (Sinopec Yangzi Petrochemical Co. Ltd.).
Daute et al., U.S. Appl. No. 12/743,878, filed May 20, 2010.
German language Written Opinion mailed on May 12, 2009 in PCT/EP2009/051401.
International Search Report mailed on May 12, 2009 in PCT/EP2009/051401.
Muller et al., U.S. Appl. No. 12/677,845, filed Mar. 12, 2010.
Muller et al., U.S. Appl. No. 12/677,896, filed Jun. 17, 2010.
Muller et al., U.S. Appl. No. 12/738,701, filed Jun. 11, 2010.
Westfechtel et al., U.S. Appl. No. 12/677,874, filed Mar. 12, 2010.

* cited by examiner

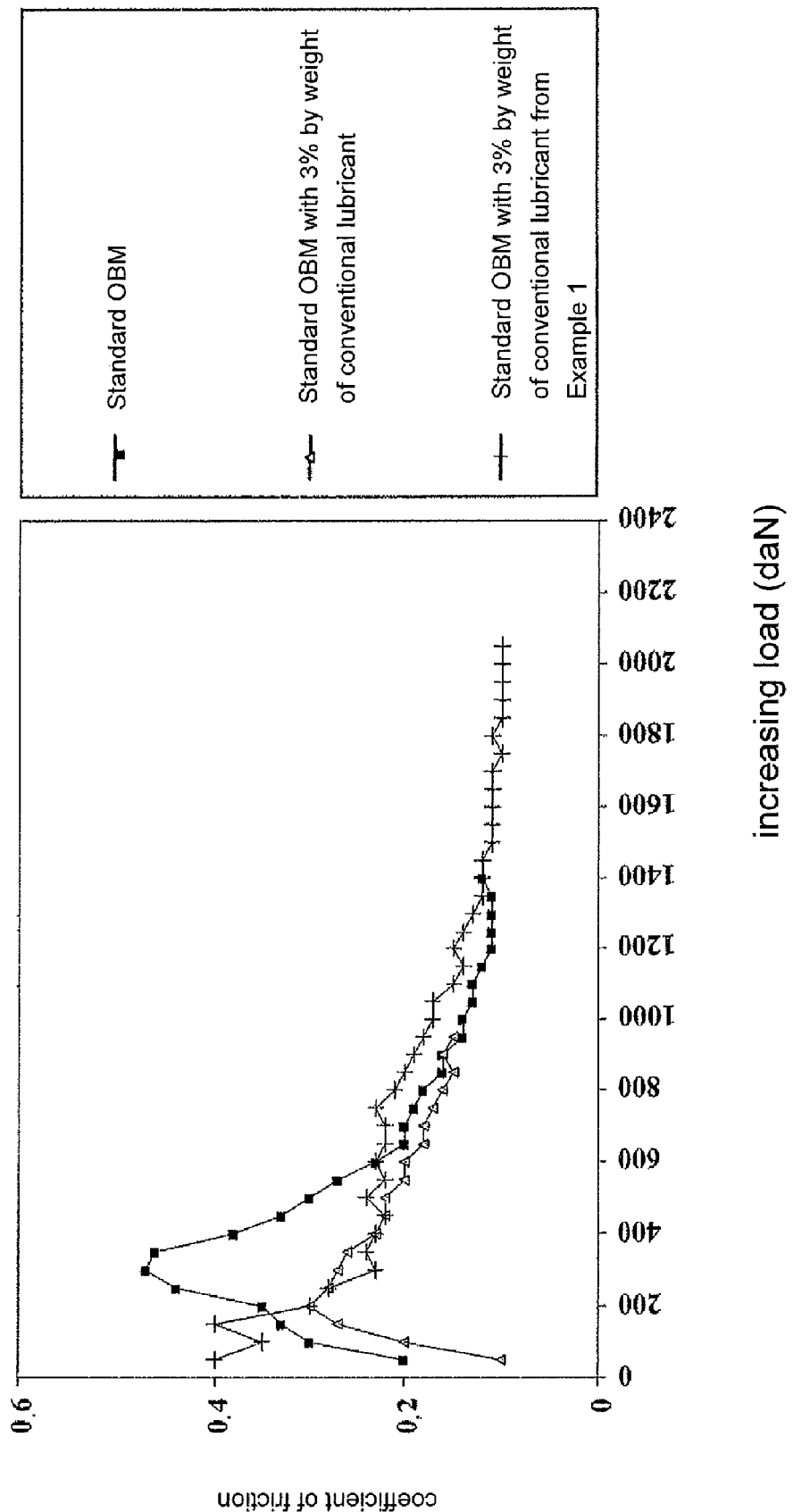

CROSSLINKED GLYCEROL OR OLIGOGLYCEROL ESTERS, AND USE THEREOF AS AN ADDITIVE IN DRILLING FLUIDS

This application is a national stage application under 35 U.S.C. 371 of International Application No. PCT/EP2009/051401 filed 6 Feb. 2009, which claims priority to German Application No. DE 10 2008 008 251.1 filed 8 Feb. 2008, the disclosures of which are expressly incorporated herein by reference.

The present invention relates to a crosslinked glycerol or oligoglycerol ester, to a method for producing a crosslinked glycerol or oligoglycerol ester, to a composition comprising a crosslinked glycerol or oligoglycerol ester of this type, to the use of a composition of this type, to a method for producing boreholes, to a method for producing an oil or a gas and also to the use of a crosslinked glycerol or oligoglycerol ester.

BACKGROUND

Borehole treatment agents are all types of auxiliary liquids which can be used in the drilling for crude oil or natural gas deposits. So called drilling liquids and drilling muds or drilling fluids built up thereon, which can be used both in land-based and in sea-based bores, are particularly important in this regard. On the one hand water-based drilling fluids are known which have a content of about 1 to 50% of emulsified oil phase—in addition to the other conventional auxiliary substances of a drilling fluid of this type—and which are also referred to as O/W emulsion fluids (oil-in-water emulsions). On the other hand, broadly oil-based fluid systems, in which the oil forms the free-flowing phase or at least a substantial portion of the free-flowing phase as a closed oil phase, are in practical use. So called invert drilling muds, which on the basis of W/O emulsions (water-in-oil emulsions) comprise a disperse, aqueous phase in the closed oil phase, are particularly important in this regard. The content of disperse, aqueous phase is conventionally in the range of from at least about 5 to 10% by weight to about 50 to 60% by weight. However, also known in addition to these W/O invert drilling muds are so called true oil muds, the liquid phase of which is formed almost exclusively from a closed oil phase, comprising in dispersed form at most small amounts—conventionally not more than about 5 to 10% by weight—of aqueous phase.

The non-aqueous phase of fluid systems of this type is formed by what is known as the carrier fluid. The carrier fluid is originally diesel oil which, mixed with specific additives, forms the actual drilling fluid. However, the end of the 1980s saw a demand for environmentally friendly fluid systems and thus environmentally friendly carrier fluids.

These were intended to be in particular more biodegradable than the previously used diesel oil.

In addition to a wide range of liquid esters, such as are described for example in EP-A-374 672, the usability of olefinic hydrocarbons and paraffins was also examined. Reference may be made in this regard by way of example to EP-A-0 765 368 which relates to the use of so called α olefins as a carrier fluid.

Drilling fluids for geological exploration are in practice dispersions made up of a liquid and a solid phase, the drilling fluid having a significant solids content. Such dispersions are liquid flushing systems for sinking rock bores, bringing up the loose drillings. It is therefore necessary for the drilling fluids to have a specific density (generally greater than 1.2 $g/cm^3$, preferably greater than 1.5 $g/cm^3$) so as to be able to prevent any collapse of the formation. For this purpose, solids are added to the fluid for weighting. Barium sulphate is generally used. Under shear loads, solids-comprising liquids of this type generally display thixotropic behavior, i.e. the viscosity of these systems, which are also referred to as non-Newtonian liquids, decreases under the influence of increasing shear stress or shear rate. In practice, this behavior can then lead to problems when the liquids are to be transported or pumped and are in the process subjected to different mechanical loads.

In addition to thickeners, drilling fluids generally also comprise viscosity modifiers in order to optimize the viscosity behavior of the drilling fluids for the particular area of application, in particular the use of hydrophobized bentonites as viscosity modifiers in drilling fluids being known in the art. In this regard, it should be borne in mind that marked thickening and thus reduced pumpability can occur in drilling fluids comprising hydrophobized bentonites of this type as viscosity modifiers, in particular in deep bores, partly on account of the very high temperatures prevailing there. This has an adverse effect inter alia on the machinery, in particular on the pumps and running times. A further aim is to keep the solids content as low as possible, in particular in very deep bores.

The present invention was based on the object of overcoming the drawbacks resulting from the prior art in relation to drilling fluids.

In particular, the present invention was based on the object of disclosing an additive which is as liquid as possible and is suitable as a thickening agent in drilling fluids, in particular in oil-based drilling fluids, so that if appropriate solid-type thickening agents or viscosity modifiers in drilling fluids may be dispensed with, but at least the amount thereof may be significantly reduced. In this case, the additive should not only display good thickening properties, but should in addition be as biodegradable as possible, so that a use of a drilling liquid comprising an additive of this type is advantageous from an ecological perspective as well. The additive should also impart an improved lubricating effect to the drilling fluid.

In addition, it should be possible to produce the above-described, advantageous additives as cost-effectively as possible compared to the additives used as a thickening agent in the prior art.

The present invention was also based on the object of disclosing a composition which is suitable as a drilling fluid, wherein this composition should have a solids content which is as low as possible. It should also be possible to use this composition as a drilling fluid in a spectrum which is as broad as possible, but in particular both in onshore and in offshore bores, above all there in deep sea bores. In addition, the drilling fluid should be distinguished by advantageous, ecotoxicological behavior, be as biodegradable as possible and be able to be produced from starting materials which are as inexpensive as possible.

SUMMARY

The present invention includes various embodiments as set forth herein.

The objects mentioned at the outset are achieved in part by a crosslinked glycerol or oligoglycerol ester which can be obtained, preferably was obtained, by crosslinking a non-crosslinked glycerol or oligoglycerol ester, wherein the non-crosslinked glycerol or oligoglycerol ester can be obtained, preferably was obtained, by reacting an (A) acid phase comprising
    (a1) a fatty acid, or
    (a2) a dicarboxylic acid, or
    (a3) a dimeric fatty acid, or
    (a4) an oligomeric fatty acid, or (a5) a hydroxy fatty acid or
(a6) a mixture of at least two thereof,
with a
(B) alcohol phase comprising
(b1) monoglycerol, or
(b2) diglycerol, or
(b3) triglycerol, or
(b4) oligoglycerol made up of more than three glycerol units, or
(b5) an alkoxylate of glycerols (b1), (b2), (b3) or (b4), or
(b6) a mixture of at least two thereof,
to form a full or partial ester and crosslinking the full or partial ester by means of a crosslinking agent, wherein the crosslinking can take place during or after the formation of the full or partial ester.

FIGURE

The foregoing and other features, aspects, and advantages of the present invention will become better understood with regard to the following description, appended claims, and accompanying drawing where:

FIG. 1 is a graph showing the correlation of the coefficient of friction and increasing load for 3 different OBM.

DETAILED DESCRIPTION

The term "partial ester", such as it is used in the present document, describes preferably an ester of the acids of the acid phase (A) and the alcohols of the alcohol phase (B), wherein at least some of the OH groups in the mono-, di-, tri- or oligoglycerols of the alcohol phase (B), for example at least 5%, even more preferably at least 10%, additionally preferably at least 20%, even more preferably at least 30%, even more preferably at least 40% and most preferably at least 50% of the OH groups originally present in the alcohol phase (B) are still in the form of OH groups after the esterification reaction and therefore not esterified.

Accordingly, the term "full ester", such as it is used in the present document, describes preferably an ester of the acids of the acid phase (A) and the alcohols of the alcohol phase (B), in which less than 10%, more preferably less than 5%, even more preferably less than 4%, additionally preferably less than 3%, even more preferably less than 2%, even more preferably less than 1% and most preferably 0% of the OH groups originally present in the alcohol phase (B) are still in the form of OH groups after the esterification reaction.

The term "crosslinked glycerol or oligoglycerol ester", such as it is used in the present document, describes preferably an ester based on glycerol, di-, tri- or oligoglycerol as the alcohol component, wherein at least two of the at least partly esterified alcohol molecules or else two of the esterified acid groups, but preferably two of the esterified alcohol groups, are crosslinked with one another via a crosslinking agent.

The crosslinked glycerol or oligoglycerol ester according to the invention can be obtained by crosslinking a non-crosslinked glycerol or oligoglycerol ester, wherein this non-crosslinked glycerol or oligoglycerol ester can for its part be obtained by reacting an acid phase (A) with an alcohol phase (B), to form a full or partial ester.

The acid phase used for this purpose comprises preferably a fatty acid (a1), a dicarboxylic acid (a2), a dimeric fatty acid (a3), an oligomeric fatty acid (a4), a hydroxy fatty acid (a5) or a mixture of at least two of these acids, fatty acids (a1) and hydroxy fatty acids (a5) being particularly preferred and fatty acids (a1) most preferred.

Fatty acid (a1) is in particular that of general formula

R—COOH in which R represents a saturated or unsaturated, branched or linear alkyl or alkenyl radical with 7 to 21 C atoms. Particularly preferred in this connection are fatty acids selected from the group consisting of caproic acid, caprylic acid, 2-ethylhexanoic acid, capric acid, lauric acid, isotridecanoic acid, myristic acid, palmitic acid, palmoleic acid, stearic acid, isostearic acid, oleic acid, elaidic acid, petroselinic acid, linoleic acid, linolenic acid, eleostearic acid, arachidic acid, gadoleic acid, behenic acid and erucic acid and also mixtures thereof formed, for example for technical reasons, in the pressure hydrolysis of natural fats and oils, in the reduction of aldehydes from Roelen's oxosynthesis. Preference is given to technical fatty acids with 12 to 18 carbon atoms, such as for example coconut, palm, palm kernel or tallow fatty acid.

It is particularly preferred for the fatty acid (a1) to be selected from singly or multiply unsaturated, branched or linear, but preferably linear monocarboxylic acids, unsaturated representatives, preferably oleic acid, including in technical qualities, being particularly preferred. It may be particularly advantageous to provide an acid phase (A) comprising as the fatty acid component (a1) exclusively linear, unsaturated fatty acids.

The use of tall oil fatty acids is also conceivable as the fatty acid (a1). Tall oil fatty acids comprise in particular mixtures of linoleic acid and conjugated $C_{18}$ fatty acids (45-65% by weight), oleic acid (25-45% by weight), octadeca-5,9,12-trienoic acid (5-12% by weight) and saturated fatty acids (1-3% by weight).

The dicarboxylic acids (a2) are likewise suitable acid components. These are carboxylic acids of the type comprising two —COOH functions in the molecule, the saturated dicarboxylic acids in particular being preferred. The dicarboxylic acids (a2) comprise preferably between 4 and 22 C atoms, in particular between 6 and 18 C atoms. Examples include oxalic, malonic, succinic, glutaric, adipic, pimelic, suberic, azelaic or sebacic acid. Unsaturated dicarboxylic acids are also possible, for example fumaric or maleic acids. The dicarboxylic acids of group (a2) do not comprise the dimeric fatty acids according to group (a3).

Dimeric fatty acids (a3) are liquid at room temperature (21° C.), oxidization stabilized dicarboxylic acids obtained for example by catalytic dimerization of unsaturated fatty acids, for example oleic acid, ricinene fatty acid or tall oil fatty acid with exclusion of oxygen. The linking produces, depending on the fatty acid used, linear, monocyclic or aromatic structures. The reaction proceeds with isomerization of isolated double bonds predominantly after a Diels-Alder-type addition. Commercially available dimerized fatty acids are worked up by distillation and consist of a mix comprising for example, in addition to low contents of linear and branched $C_{18}$ monocarboxylic acids (monomeric fatty acid), predominantly $C_{36}$ dicarboxylic acids and, depending on the working-up effort, differingly high contents of $C_{54}$ tricarboxylic acid (trimeric fatty acid) as well as traces of higher polymeric fatty acids. Both highly pure dimeric fatty acids having a dicarboxylic acid content of >97% by weight and hydrogenated, completely non-yellowing types are produced industrially.

Oligomeric fatty acids (a4) are products of the mutual reaction of unsaturated fatty acids, wherein more than 2 and at most 5 fatty acid molecules must react with one another. This acid component is likewise a mixture of different oligomers with one another.

Furthermore, hydroxy fatty acids can be used as component (a5), ricinoleic acid and particularly preferably 12-hydroxystearic acid being representatives of this class of fatty acids, for example. Further suitable fatty acids are for example selected from the group consisting of hydrogenated castor oil fatty acids (fatty acids comprising small amounts of stearic acid and palmitic acid, as well as 12-hydroxystearic acid), sabinic acid, 2-hydroxytetradecanoic acid, ipurolinic acid (3,11-dihydroxytetradecanoic acid, 2-hydroxyhexadecanoic acid, jalapinolic acid, juniperic acid, ambrettolic acid, aleuritic acid, 2-hydroxyoctadecanoic acid, 18-hydroxyoctadecanoic acid, 9,10-dihydroxyoctadecanoic acid, kamiolenic acid, ferronic acid, cerebronic acid, 9-hydroxystearic acid and 10-hydroxystearic acid.

Mixtures of various acid components can also be used in accordance with alternative (a6) as acid phase (A). Mixtures of saturated and unsaturated fatty acids and/or dicarboxylic acids and/or dimeric and/or oligomeric fatty acids are in particular preferred in this regard.

The acid phase (A) is reacted with the alcohol phase (B), to form a partial or full ester.

According to a preferred embodiment of the crosslinked glycerol or oligoglycerol ester according to the invention, the alcohol phase (B) is a mixture (b6) comprising b1) 5 to 45% by weight, particularly preferably 10 to 40% by weight and most preferably 25 to 35% by weight of monoglycerol, b2) 15 to 45% by weight, particularly preferably 20 to 40% by weight and most preferably 25 to 35% by weight of diglycerol, b3) 10 to 40% by weight, particularly preferably 15 to 35% by weight and most preferably 20 to 30% by weight of triglycerol, and also b4) 1 to 40% by weight, particularly preferably 5 to 30% by weight and most preferably 10 to 20% by weight of oligoglycerols made up of more than three glycerol units, the amounts specified being based on the total weight of the alcohol phase (B).

According to a particularly preferred embodiment of the crosslinked glycerol or oligoglycerol ester according to the invention, the alcohol phase (B) used for the production thereof comprises at least 80% by weight, particularly preferably at least 85% by weight and most preferably at least 87% by weight, based in each case on the total weight of the alcohol phase (B), of a glycerol comprising 2 or more glycerol units. Examples of an alcohol phase (B) of this type include the product POLYGLYCEROL-3 from Solvay Chemicals International SA., Brussels, Belgium.

In addition to the aforementioned mixture of mono-, di-, tri- and oligoglycerols, the alcohol phase (B) used may also be pure monoglycerol, pure diglycerol, pure triglycerol, pure polyglycerol or a mixture consisting exclusively of oligoglycerols made up of more than three glycerol units. However, according to the invention, particular preference is given to the use of a mixture comprising about 30% by weight of monoglycerol (b1), about 30% by weight of diglycerol (b2), about 25% by weight of triglycerol (b3) and about 15% by weight of oligoglycerol (b4).

In addition to the mono-, di-, tri- or oligoglycerols, the alcohol phase (B) can also comprise the alkoxylates of these glycerols, i.e. the products of the reaction of mono-, di-, tri- or oligoglycerols with ethylene oxide and/or propylene oxide.

The non-crosslinked glycerol or oligoglycerol ester can be produced by reacting the acid phase (A) with the alcohol phase (B) obtaining a full or partial ester by any method known to the person skilled in the art for producing an ester from alcohols and fatty acids, from alcohols and hydroxy fatty acids or from alcohols and derivatives of fatty acids or hydroxy fatty acids. Reference may be made at this point by way of example to EP-A-0 064 697 which describes the production of oligoglycerol esters by means of basic catalysis from fatty acids and poly- or oligoglycerols.

The crosslinked glycerol or oligoglycerol esters according to the invention are crosslinked. Crosslinked glycerol or oligoglycerol esters of this type can for example be obtained in that the full or partial esters described hereinbefore are crosslinked by means of a suitable crosslinking agent, the crosslinking agent used being preferably compounds having at least two functional groups which are capable of reacting with free OH groups or else with ester groups of the partial or full ester.

The wording "wherein the crosslinked glycerol or oligoglycerol ester can be obtained by crosslinking a non-crosslinked glycerol or oligoglycerol ester", such as it is used in the present document, is intended merely to express the fact that the crosslinked glycerol or oligoglycerol ester has a chemical structure such as can be obtained when a non-crosslinked glycerol or oligoglycerol ester described hereinbefore is subsequently crosslinked after production thereof. However, the wording reproduced hereinbefore also includes crosslinked glycerol or oligoglycerol esters which were for example obtained in that the crosslinking takes place by means of the crosslinking agents described hereinbefore during the reaction of the acid phase (A) with the alcohol phase (B).

According to a preferred embodiment of the crosslinked glycerol or oligoglycerol esters according to the invention, the non-crosslinked glycerol or oligoglycerol ester is a partial ester and the crosslinking agent is a compound having at least two functional groups which are capable of reacting with the free OH groups of the partial ester to form a covalent bond.

A partial ester of this type can preferably be obtained in that the alcohol component (B) is reacted with the acid component (A) in a molar ratio of OH groups:acid groups in a range of from 1.1:1 to 4:1, particularly preferably 1.2:1 to 3:1 and most preferably 1.3:1 to 2:1. The expression "molar ratio of OH groups:acid groups" specifies in this case the molar ratio of the sum of all the OH groups of the alcohol phase (B) to the sum of all the acid groups in the acid phase (A). If for example the alcohol phase (B) used is a composition which is made up of about 30% by weight of monoglycerol (b1), about 30% by weight of diglycerol (b2), about 25% by weight of triglycerol (b3) and about 15% by weight of oligoglycerol and has on average about 4 OH groups for each glycerol or oligoglycerol unit, then, in a molar ratio of OH groups:acid groups of for example 1.33, about 3 moles of acid are used for each mole of glycerol or oligoglycerol.

In this connection, it is furthermore particularly preferred for the crosslinking agent, which has at least two functional groups which are capable of reacting with the free OH groups of the partial ester forming a covalent bond, to be a dicarboxylic acid, a dimeric fatty acid, a hydroxycarboxylic acid, a diepoxide, or a tetraalkoxysilane. On use of dicarboxylic acids, the crosslinking accordingly takes place preferably through esterification of the OH groups which are still free by means of the dicarboxylic acid. Preferred dicarboxylic acids are in particular selected from the group consisting of phthalic acid anhydride, isophthalic acid, terephthalic acid, tetrahydrophthalic acid anhydride, hexahydrophthalic acid anhydride, naphthalene dicarboxylic acid, 4,4'-biphenyl dicarboxylic acid, diphenylmethane-4,4'-dicarboxylic acid, succinic acid, fumaric acid, adipic acid, sebacic acid, azelaic acid and maleic acid anhydride, of these, adipic acid and azelaic acid being particularly preferred. The hydroxycarboxylic acids used may for example be hydroxycarboxylic acids selected from the group consisting of citric acid, L-lactic acid, D-lactic acid, DL-lactic acid, glycolic acid, 3-hydroxybutyric acid, 4-hydroxybutyric acid, 4-hydroxyvaleric acid, 5-hydroxyvaleric acid, 6-hydroxycaproic acid and also mixtures of these hydroxycarboxylic acids, of these, citric acid and lactic acid being particularly preferred. The tetraalkoxysilane is in particular tetraethoxysilane. Crosslinking agents which are particularly preferred in accordance with the invention among the aforementioned crosslinking agents are dimeric fatty acids, adipic acid and azelaic acid.

According to another preferred embodiment of the crosslinked glycerol or oligoglycerol esters according to the invention, the non-crosslinked glycerol or oligoglycerol ester is a full ester and the crosslinking agent is a compound comprising at least two functional groups which are capable of reacting with functional groups of the acid component used for the production of esters, for example with the OH groups of the hydroxy fatty acids, to form a covalent bond. In this case too, the crosslinking agents are in particular dicarboxylic acids or tetraalkoxysilanes.

The amounts in which the crosslinking agents mentioned hereinbefore are added are dependent on how highly the non-crosslinked glycerol or oligoglycerol esters are to be crosslinked. The optimum crosslinking for the area of application in question can easily be determined by the person skilled in the art by means of simple routine tests in which the crosslinking agent is used in increasing amounts. The reaction conditions, in particular the temperature conditions, under which the crosslinking is carried out depend on the type of the crosslinking agent used. However, conventionally, the crosslinking is carried out at a temperature in a range of from 50 to 300° C., particularly preferably in a range of from 100 to 250° C.

The objects mentioned at the outset are also achieved in part by a method for producing a crosslinked glycerol or oligoglycerol ester, comprising the method steps
   i) providing an acid phase (A) comprising
      (a1) a fatty acid, or
      (a2) a dicarboxylic acid, or
      (a3) a dimeric fatty acid, or
      (a4) an oligomeric fatty acid, or
      (a5) a hydroxy fatty acid or
      (a6) a mixture of at least two thereof;
   ii) providing an alcohol phase (B) comprising
      (b1) monoglycerol, or
      (b2) diglycerol, or
      (b3) triglycerol, or
      (b4) oligoglycerol made up of more than three glycerol units, or
      (b5) an alkoxylate of glycerols (b1), (b2), (b3) or (b4), or
      (b6) a mixture of at least two thereof;
   iii) reacting the acid phase (A) with the alcohol phase (B) to form a full or partial ester;
   iv) crosslinking the full or partial ester by means of a crosslinking agent,
   wherein the crosslinking can take place during or after the formation of the full or partial ester.

As acid phase (A), alcohol phase (B) and crosslinking agent, preference is given to those acid phases, alcohol phases and crosslinking agents which were mentioned at the outset in relation to the crosslinked glycerol or oligoglycerol esters according to the invention as being a preferred acid phase (A), alcohol phase (B) and crosslinking agent.

According to a particular embodiment of the method according to the invention for producing a crosslinked glycerol or oligoglycerol ester, the crosslinking takes place during the formation of the full or partial ester. According to another particular embodiment of the method according to the invention for producing a crosslinked glycerol or oligoglycerol ester, the crosslinking takes place after the formation of the full or partial ester. However, according to the invention, preference is given to a method in which firstly a non-crosslinked glycerol or oligoglycerol ester is formed and only then does crosslinking take place.

The objects mentioned at the outset are also achieved in part by a composition comprising as a component the crosslinked glycerol or oligoglycerol ester described hereinbefore and at least one further component. In this case, it is in particular preferred for this composition to comprise an oil phase, an aqueous phase or an emulsion comprising an oil phase and an aqueous phase as at least one further component. In particular, the composition may be a water-in-oil emulsion, an oil-in-water emulsion or an aqueous solution.

According to a particular embodiment of the composition according to the invention, this composition is a water-in-oil emulsion.

In this connection, it is particularly preferred for the composition to comprise
I) 28.9 to 99% by weight, particularly preferably 60 to 90% by weight and most preferably 70 to 80% by weight, based in each case on the total weight of the composition, of an organic oil phase which is non-miscible with water,
II) 1 to 48% by weight, preferably, particularly preferably 5 to 40% by weight and most preferably 10 to 30% by weight, based in each case on the total weight of the composition, of water or aqueous phase,
III) 0.1 to 20% by weight, particularly preferably 1 to 15% by weight and most preferably 5 to 10% by weight, based in each case on the total weight of the composition, of the crosslinked glycerol or oligoglycerol ester described at the outset, and also
IV) 0 to 70% by weight, particularly preferably 1 to 5% by weight and most preferably 1.5 to 3% by weight, based in each case on the total weight of the composition, of at least one further additive,
wherein the sum of components I) to IV) is 100% by weight.

In relation to the water-in-oil emulsion described hereinbefore, it is preferred for the organic oil phase I) to be wholly or partly selected from the group of
   a) paraffins comprising 5 to 22 C atoms and/or
   b) paraffins comprising 5 to 22 C atoms and/or
   c) internal olefins comprising 12 to 30 C atoms in the molecule and/or
   d) carboxylic acid esters of general formula R—COO—R, in which R represents a linear or branched, saturated or unsaturated alkyl radical comprising 15 to 25 C atoms and R' represents a saturated, linear or branched alkyl radical comprising 3 to 22 C atoms, and/or
   e) mineral oils, and/or
   f) linear alpha olefins (LAOS) comprising 12 to 30 C atoms, and/or
   g) carbonates.

In this connection, it is furthermore preferred for this water-in-oil emulsion to have a density of the liquid component in a range of from 1.2 to 3.0 g/cm$^3$ and in particular in a range of from 1.5 to 3.0 g/cm$^3$. The oil phase of the systems according to the invention comprises components a) to e) alone or components a), b), d) or e) together in a blend with esters c) and also if appropriate in a blend with other suitable oil phases. Any desired mixtures of oil phases a) to e) with one another are also possible.

Component a)

According to the invention, linear or branched paraffins comprising 5 to 22 C atoms are used as component a). Paraffins—referred to more accurately as alkanes—are known to be saturated hydrocarbons which, for the linear or branched representatives, follow general total formula $C_nH_{2n+1}$. The cyclic alkanes follow general total formula $C_nH_{2n}$. The linear and branched paraffins are particularly preferred, whereas cyclic paraffins are less preferred. The use of branched paraffins is preferred in particular. Furthermore, preference is given to paraffins of the type that are liquid at room temperature, i.e. those comprising 5 to 16 C atoms per molecule. However, it may also be preferable to use paraffins which comprise 17 to 22 C atoms and have a wax-like consistency. However, it is preferable to use mixtures of the various paraffins, it being particularly preferred if these mixtures are still liquid at 21° C. Mixtures of this type can for example be formed from paraffins comprising 10 to 21 C atoms. Paraffins are particularly preferred oil phases—alone or as part of a mixture with further oil phases—in drilling fluids—preferably those of the invert type, in which the crosslinked glycerol or oligoglycerol esters according to the invention are used as thickeners.

Component b)

According to the invention, internal olefins (referred to hereinafter as IOs for short) can be used as component b). In this case, IOs are likewise compounds which are known per se and can be produced by all methods known to the person skilled in the art for this purpose. EP 0 787 706 A1 describes for example a method for the synthesis of IOs by isomerization of alpha olefins in sulphonic or persulphonic acids. A characteristic of this is the fact that the IOs obtained in this way are linear and comprise at least one olefinic double bond which is not located in the alpha position of the alkyl chain. According to the invention, use is preferably made of IOs or IO mixes of the type comprising IOs comprising 12 to 30 C atoms in the molecule, preferably comprising 14 to 24 C atoms and in particular comprising up to 20 C atoms in the molecule.

Component c)

Furthermore, esters of general formula R—COO—R', in which R represents a linear or branched, saturated or unsaturated alkyl radical comprising 15 to 25 C atoms and R' represents a saturated, linear or branched alkyl radical comprising 6 to 22 C atoms, are part of the oil phases according to the invention. Esters of this type are also known chemical compounds. The basic use thereof in drilling fluids is for example the subject matter of EP 0 374 672 A1 or EP 0 374 671 A1. Particular preference is given to the use of esters of the type whose radical R represents a saturated or unsaturated alkyl radical comprising 15 to 25 and R' represents a saturated alkyl radical comprising 3 to 10 C atoms. The saturated compounds are in this case preferred in particular. It is preferred within the scope of the inventive teaching for the oil phase to comprise, in addition to the esters according to the foregoing description, at most 15% by weight (based on the oil phase) of other esters comprising radicals R representing alkyl radicals comprising more than 23 C atoms.

Component d)

Mineral oils are a collective name for the liquid distillation products which are obtained from mineral raw materials (crude oil, brown and hard coals, wood or peat) and consist substantially of mixes of saturated hydrocarbons. Preferably, the mineral oils comprise only low quantities of aromatic hydrocarbons, preferably less than 3% by weight. Crude oil-based liquid mineral oils are preferred at 21° C. The mineral oils preferably have boiling points of from 180 to 300° C.

Component e)

Linear alpha olefins (LAOs for short) are unbranched hydrocarbons which are unsaturated in the 1 position ("alpha C atom"). They may be based on natural substances, but are in particular obtained to a large extent also synthetically. Natural substance-based LAOs are obtained by dehydration of natural substance-based fatty alcohols as linear products having a straight-chain carbon number. Although the synthetically obtained LAOs—produced by oligomerization of ethylene—also frequently comprise straight-chain carbon numbers in the chain, methods for producing odd-numbered alpha olefins are nowadays also known. In the sense of the definition according to the invention, they have—on account of their volatility—generally at least 10, preferably at least 12 to 14 C atoms in the molecule. The upper limit of the LAOs which are free-flowing at room temperature is in the range of from $C_{18}$ to $C_{20}$. However, this upper limit does not restrict the applicability of this class of substances within the scope of the invention. The upper limit of suitable LAO compounds for use within the teaching according to the invention is therefore well above the aforementioned limit value of from $C_{18}$ to $C_{20}$ and can for example reach $C_{30}$.

Component f)

Within the scope of the present application, the term "carbonates" refers to carbonic acid esters of fatty alcohols comprising 8 to 22 C atoms, preferably the diesters of carbonic acid. Compounds of this type and the use thereof as the oil phase for drilling fluids are described in DE 40 18 228 A1.

In addition to components a) to f), the oil phase I) can also comprise other, water-insoluble constituents, provided that the constituents are ecologically compatible. Further particularly suitable mixture constituents of the oil phase I) according to the invention are therefore specifically:

(i) esters of $C_{1-5}$ monocarboxylic acids and mono- and/or polyfunctional alcohols, radicals made up of monohydric alcohols having at least 6, preferably at least 8 C atoms and the polyhydric alcohols having preferably 2 to 6 C atoms in the molecule, (ii) mixtures of secondary esters, selected from the group of propyl carboxylate, butyl carboxylate, pentyl carboxylate, hexyl carboxylate, heptyl carboxylate, octyl carboxylate, nonyl carboxylates, decyl carboxylate, undecyl carboxylate, dodecyl carboxylate, tridecyl carboxylate, tetradecyl carboxylate, pentadecyl carboxylate, hexadecyl carboxylate, heptadecyl carboxylate, octadecyl carboxylate, nonadecyl carboxylate, eicosyl carboxylate, uneicosyl carboxylate, doeicosyl carboxylate and isomers thereof, the secondary esters each having a carboxylate radical comprising 1 to 5 C atoms, water-insoluble ethers of monohydric alcohols comprising 6 to 24 C atoms, (iii) water-insoluble alcohols comprising 8 to 36 C atoms (iv) poly-alpha olefins (PAO)

(v) mixtures of components (i) to (iv)

The oil phase I) of the composition according to the invention in the form of a water-in-oil emulsion preferably has pour points below 0° C., preferably below −5° C. (measured in accordance with DIN ISO 3016: 1982-10). The Brookfield viscosity of the oil phase is at 0° C. at most 50 mPas. The borehole treatment agents according to the invention have, in so far as they are embodied as a W/O-type oil-based drilling fluid, a plastic viscosity (PV) in the range of from 10 to 70 mPas and a yield point (YP) of from 5 to 60 lb/100 ft², in each case determined at 50° C. The kinematic viscosity of the oil phase, measured in accordance with Ubbelohde at 20° C., should be preferably at most 12 mm²/sec. The aqueous phase of the agents according to the invention has preferably a pH value in the range of from 7.5 to 12, preferably from 7.5 to 11 and in particular from 8 to 10.

As the aqueous phase according to component II), the composition according to the invention preferably comprises aqueous saline solutions, preferably saturated saline solutions, wherein the salts used may be all the alkali or alkaline-earth halides known to the person skilled in the art. Examples of suitable salts include in particular KCl, NaCl, LiCl, KBr, NaBr, LiBr, $CaCl_2$, and $MgCl_2$, of these, $CaCl_2$, NaCl and KCl or mixtures of these salts being particularly preferred.

The further additives which can be comprised in the composition according to the invention in accordance with component IV) are in particular additives selected from the group consisting of surfactants as a component added to the crosslinked glycerol or oligoglycerol ester, weighting agents, fluid loss additives, pH modifiers, further viscosity-modifying additives, wetting agents, salts, biocides, agents for inhibiting the undesired exchange of water between drilled formations—for example water-swellable clays and/or salt layers—and the for example water-based drilling liquid, wetting agents for an improved strike of the emulsified oil phase on solid surfaces, for example to improve the lubricating effect, but also to improve the oleophilic closure of exposed rock formations, or rock faces, corrosion inhibitors, alkali reserves and emulsifiers.

The general principles for the composition of the treatment liquids in question, for which exemplary statements will be made hereinafter with reference to corresponding drilling mud, apply here. The additives may be water-soluble, oil-soluble and/or water- or oil-dispersible.

The surfactants used may be anionic, nonionic, zwitterionic or cationic surfactants. However, nonionic and anionic surfactants are preferred. Typical examples of anionic surfactants are soaps, alkyl benzene sulphonates, alkane sulphonates, olefin sulphonates, alkyl ether sulphonates, glycerol ether sulphonates, methyl ester sulphonates, sulpho fatty acids, alkyl sulphates, fatty alcohol ether sulphates, glycerol ether sulphates, fatty acid ether sulphates, hydroxy mixed ether sulphates, monoglyceride (ether) sulphates, fatty acid amide (ether) sulphates, mono- and dialkyl sulphosuccinates, mono- and dialkyl sulphosuccinamates, sulphotriglycerides, amide soaps, ether carboxylic acids and the salts thereof. In the sense of the present technical teaching, the latter are particularly preferred surfactant components. Typical examples of nonionic surfactants are fatty alcohol polyglycol ethers, alkylphenol polyglycol ethers, fatty acid polyglycol esters, fatty acid amide polyglycol ethers, fatty amine polyglycol ethers, alkoxylated triglycerides, mixed ethers or mixed formals, if appropriate partially oxidized alk(en)yl oligoglycosides or glucoronic acid derivatives, fatty acid-N-alkyl glucamides, polyol fatty acid esters, sugar esters, sorbitan esters, polysorbates and amine oxides. If the nonionic surfactants comprise polyglycol ether chains, these can have a conventional, but preferably a narrowed distribution of homologues. The surfactants are an optional constituent of the additives. They are used preferably in amounts of from 0.01 to 2% by weight, in particular from 0.1 to 1.5% by weight and preferably from 0.2 to 0.5% by weight, based in each case on the total water-in-oil emulsion.

The emulsifiers may preferably be nonionic emulsifiers which are in particular to be assigned to one of the following classes of substance: (oligo)alkoxylates—in particular low alkoxylates, corresponding ethoxylates and/or propoxylates being particularly important in this regard—of basic molecules of natural and/or synthetic origin that comprise lipophilic radicals and are capable of alkoxylation. Alkoxylates of the specified type are known as nonionic emulsifiers of this type—i.e. with a terminal free hydroxyl group in the alkoxylate radical; however, the corresponding compounds can also be end-capped, for example by esterification and/or etherification. A further important class of nonionic emulsifiers for the purposes of the invention are partial esters and/or partial ethers of polyfunctional alcohols comprising in particular 2 to 6 C atoms and 2 to 6 OH groups and/or the oligomers thereof with acids and/or alcohols comprising lipophilic radicals. Also suitable in this regard are in particular compounds of this type additionally comprising in their molecular structure (oligo)alkoxy radicals and in this case in particular corresponding oligoethoxy radicals bound-in. The polyfunctional alcohols comprising 2 to 6 OH groups in the basic molecule or the oligomers derived there from may in particular be diols and/or triols or the oligomerization products thereof, wherein glycol and glycerol or the oligomers thereof may be particularly important. Known nonionic emulsifiers of the ethylene oxide/propylene oxide/butylene oxide block polymers type are also to be assigned to the range of partial ethers of multifunctional alcohols. A further example of corresponding emulsifier components are alkyl(poly)glycosides of long-chain alcohols and also the aforementioned fatty alcohols of natural and/or synthetic origin or alkylolamides, amine oxides and lecithins. The concomitant use of alkyl(poly)glycoside compounds (APG compounds), which are nowadays conventional in the trade, as emulsifier components in the sense according to the invention may be of particular interest inter alia because this is a class of emulsifier having particularly pronounced ecological compatibility. From the substance classes listed in the present document for suitable emulsifier components, reference is additionally made, without claim to completeness, to the following representatives: (oligo)alkoxylates of fatty alcohols, fatty acids, fatty amines, fatty amides, fatty acid and/or fatty alcohol esters and/or ethers, alkanol amides, alkyl phenols and/or the products of the reaction thereof with formaldehyde and also further products of the reaction of carrier molecules comprising lipophilic radicals with low alkoxides. As indicated, the reaction products in question may also be at least partially end-capped. Examples of partial esters and/or partial ethers of polyfunctional alcohols are in particular the corresponding partial esters with fatty acids, for example of the glycerol mono- and/or diester, glycol monoester type, corresponding partial esters of oligomerized polyfunctional alcohols, sorbitan partial esters and the like and also corresponding compounds with ether groupings.

The concomitant use of organic polymer compounds of natural and/or synthetic origin as further additives may also be very important in this connection. Examples of this are in particular starch or chemically modified starches, cellulose derivatives such as carboxymethylcellulose, guar gum, xanthan gum or else purely synthetic, water-soluble and/or water-dispersible polymer compounds, in particular of the type of polyacrylamide compounds of high molecular weight with or without anionic or cationic modification. Viscosity control diluents: the so called diluents may be organic or inorganic in nature; examples of organic diluents are tannins and/or Quebracho extract. Further examples of this are lignite and lignite derivatives, in particular lignosulphonates.

Since the crosslinked glycerol or oligoglycerol esters comprised in the composition according to the invention function as a thickening agent, the addition of further thickening agents, in particular further thickening agents based on water-insoluble, inorganic components, is not required in accordance with a preferred embodiment of the composition according to the invention. Nevertheless, it may prove advantageous to use the crosslinked glycerol or oligoglycerol esters if appropriate in combination with at least one further thickening agent. Further thickening agents which are preferred in accordance with the invention include in particular baryte, calcite, mullite, dolomite, galena, hematite, manganese oxides, iron oxides or mixtures of these compounds, water-soluble thickening agents, such as water-soluble zinc salts, water-soluble iron salts, water-soluble barium salts, water-soluble calcium salts or mixtures of these salts. Specific examples of suitable, further thickening agents include $Fe_2O_3$, $MnO_4$ and $CaCO_3$. Viscosity-increasing agents may be organic or inorganic compounds, such as for example xanthan, rubber, guar rubber, glycol, carboxymethylcellulose, polyanionic cellulose or starch. The further wetting agent which is preferred in accordance with the invention for setting a required pressure compensation is baryte.

The preferred liquid loss prevention agent (fluid loss additive) is in particular organophilic lignite, whereas preferred pH modifiers can be inferred from EP 0 382 701 A1, for example. The invention described in EP 0 382 701 A1 is based on the finding that in water-in-oil-type, ester-based drilling fluids use is to be made of additives which ensure that the rheological properties of the drilling fluid do not change even when increasing amounts of free carboxylic acids are released as a result of partial ester hydrolysis. Where possible, these free carboxylic acids should be converted into compounds displaying stabilizing and emulsifying properties. For this purpose, EP 0 382 701 A1 proposes adding highly oleophilic alkaline amines which are as insoluble in water as possible and are able to form salts with the free acids. Typical examples of amine compounds of this type are primary, secondary and/or tertiary amines which are predominantly water-insoluble and which can in addition be at least partly alkoxylated and/or substituted with hydroxyl groups. Further examples include amino amides and/or heterocycles comprising nitrogen as the ring atom. Basic amines having at least one long-chain hydrocarbon radical comprising 8 to 36 carbon atoms, preferably comprising 10 to 24 carbon atoms, are for example suitable, wherein these hydrocarbon radicals may also be singly or multiply unsaturated.

The amounts in which the further additives described hereinbefore of the composition according to the invention are added in the case of a water-in-oil emulsion correspond conventionally to the amounts in which these compounds are added to the water-in-oil-based drilling fluids known in the art.

In low-weighted compositions, component IV) is preferably a weighting agent, such as for example $BaSO_4$, component IV) being used preferably in an amount of up to 20% by weight in the case of a low-weighted composition. In more highly weighted compositions, component IV) is used preferably in an amount of from 20 to 50% by weight, whereas 50 to 70% by weight of component IV) can be used in highly weighted compositions.

Furthermore, according to the invention, it is preferred for the composition to be, in so far as it is in the form of a water-in-oil emulsion, a nanoemulsion or a microemulsion preferably comprising drops of water or drops of an aqueous phase having a drop size of less than 1,000 µm, preferably having a drop size in a range of from 5 nm to 1,000 µm, particularly preferably having a drop size in a range of from 10 nm to 850 µm, even more preferably having a drop size in a range of from 20 nm to 700 µm, even more preferably having a drop size in a range of from 50 nm to 500 µm. According to the invention, the terms "microemulsion" and "nanoemulsion" characterize emulsions comprising drops in the micrometer or nanometer range, wherein there may be a certain overlap of these two ranges and thus also of these two terms. According to a part of the specialist literature and also of the prior art relating to drilling fluids, the term "microemulsions" refers preferably to emulsions of the type which are formed spontaneously on combination of the components of the emulsion, whereas the formation of nanoemulsions conventionally requires the supply of energy, for example in the form of homogenizing, in particular in the form of high-pressure homogenization.

In the case of a water-in-oil emulsion as the composition according to the invention, the composition can be produced by any method known to the person skilled in the art for producing a water-in-oil emulsion of this type. Thus, it is in particular conceivable first to produce the base emulsion from the organic oil phase as the continuous phase and the drops of water emulsified therein and only then to add the crosslinked glycerol or oligoglycerol ester described at the outset and if appropriate the further additives. It is however also conceivable first to add the crosslinked glycerol or oligoglycerol esters described at the outset to the organic oil phase and then to form the emulsion from this oil phase and the water or the aqueous solution.

According to another particular embodiment of the composition according to the invention, the composition is an aqueous solution or an oil-in-water emulsion.

In this connection, it is in particular preferred for the composition to comprise
I) 0 to 48% by weight, particularly preferably 0.1 to 20% by weight and most preferably 1 to 10% by weight, based in each case on the total weight of the composition, of an organic oil phase which is non-miscible with water,
II) 29.9 to 99.9% by weight, particularly preferably 60 to 99% by weight and most preferably 70 to 95% by weight, based in each case on the total weight of the composition, of water or aqueous phase,
III) 0.1 to 20% by weight, particularly preferably 1 to 15% by weight and most preferably 5 to 10% by weight, based in each case on the total weight of the composition, of the crosslinked glycerol or oligoglycerol ester described at the outset,
IV) 0 to 70% by weight, particularly preferably 1 to 5% by weight and most preferably 1.5 to 3% by weight, based in each case on the total weight of the composition, of at least one further additive,
wherein the sum of components I) to IV) is 100% by weight.

As the organic oil phase, aqueous phase and further additives, preference is given to those organic oil phases, aqueous phases and further additives mentioned hereinbefore in relation to the water-in-oil emulsion.

Even in the case of an oil-in-water emulsion as the composition according to the invention, the composition can be produced by any method known to the person skilled in the art for producing an oil-in-water emulsion of this type. Thus, it is in particular conceivable first to produce the base emulsion from water or the aqueous solution as the continuous phase and the drops of the oil phase emulsified therein and only then to add the crosslinked glycerol or oligoglycerol ester described at the outset and if appropriate the further additives. It is however also conceivable first to add the crosslinked glycerol or oligoglycerol esters described at the outset to the organic oil phase and then to form the emulsion from this oil phase and the water or the aqueous solution.

The objects mentioned at the outset are also achieved in part by the use of the composition described hereinbefore, in particular the composition described hereinbefore in the form of a water-in-oil emulsion, an aqueous solution or an oil-in-water emulsion, in the drilling of boreholes.

The objects mentioned at the outset are also achieved in part by a method for producing boreholes, in which a drilling fluid is pumped through a borehole, a composition as described hereinbefore being used as drilling fluid, but in particular a composition in the form of a water-in-oil emulsion, an aqueous solution or an oil-in-water emulsion, as described hereinbefore.

According to a preferred embodiment of this method for producing boreholes, the method comprises the method steps:
(α1) providing the composition according to the invention, in particular the composition according to the invention in the form of a water-in-oil emulsion, an aqueous solution or an oil-in-water emulsion;
(α2) drilling a hole into the ground;
(α3) introducing, preferably circulating, the composition provided in method step (α1) at least partly into or in the borehole;
wherein the introducing, preferably the circulating, takes place preferably at least partly during the drilling in method step (α2).

The composition according to the invention therefore acts as a drilling fluid in the drilling of holes in the ground, preferably when drilling for crude oil or natural gas.

The objects mentioned at the outset are therefore also achieved in part by a method for producing an oil or a gas, comprising the method steps:
(α1) providing the composition according to the invention, in particular the composition according to the invention in the form of a water-in-oil emulsion, an aqueous solution or an oil-in-water emulsion;
(α2) drilling a hole into the ground;
(α3) introducing, preferably circulating, the composition provided in method step (α1) at least partly into or in the borehole, wherein, in this case too, introducing or circulating takes place preferably at least partly during the drilling in method step (α2);
(α4) extracting oil or gas from the ground through the hole drilled in method step (α2);
(α5) optionally purifying or refining the oil or gas extracted in method step (α4):

The objects mentioned at the outset are also achieved in part by the use of a crosslinked glycerol or oligoglycerol ester, preferably a crosslinked glycerol or oligoglycerol ester as described at the outset, as a lubricant, as a thickening agent or as a viscosity forming agent for drilling fluids.

According to a preferred embodiment of the use according to the invention, the use concerns the use of the crosslinked glycerol or oligoglycerol ester in oil-based drilling fluids, the term "oil-based drilling fluids" referring preferably to systems of the type of which at least 50% by weight, preferably at least 70% by weight, in particular at least 80% by weight and most preferably at least 90% by weight, based in each case on the phase of the system, which is liquid at room temperature (21° C.), are based on an organic oil phase which is non-miscible with water, this oil-based drilling fluid being preferably the water-in-oil emulsion described hereinbefore.

According to another preferred embodiment of the use according to the invention, the use relates to the use of the crosslinked glycerol or oligoglycerol ester in water-based drilling fluids, the term "water-based drilling fluids" referring preferably to systems of the type of which at least 50% by weight, preferably at least 70% by weight, in particular at least 80% by weight and most preferably at least 90% by weight, based in each case on the phase of the system, which is liquid at room temperature (21° C.), are based on water, this water-based drilling fluid being preferably the aqueous solution described hereinbefore or the oil-in-water emulsion described hereinbefore.

The invention will now be described in greater detail with reference to figures and non-limiting examples.

FIG. 1 shows the lubricant effect of the crosslinked oligoglycerol esters according to the invention in an oil-based drilling fluid.

EXAMPLES

Example 1

Production of a Crosslinked Oligoglycerol Ester According to the Invention (Edenor Ti05/adipic acid diglycerol 3/1 [—COOH]:4 [—OH]
837 g of oleic acid (the product Edenor® Ti05 from the company Oleochemicals, Düsseldorf, Germany), 73.07 g of adipic acid and 171.2 g of diglycerol are heated to 240° C. under an $N_2$ atmosphere. The elimination of water commences from a temperature of 195° C., a gel-like substance made up of oleic acid/glycerol/water precipitating in the cooler. After approx. 2 hours the distillation is ended and the acid number of the product is determined. If the acid number is less than 30, then the mixture is cooled to 220° C., the $N_2$ connection is closed and subsequently a vacuum is carefully applied. After 2 to 3 hours the heating is removed and the mixture is cooled under vacuum.
For working up the reaction product, the mixture is stirred for 15 minutes using a Tonsil stirrer; a vacuum is then applied briefly and a little Celatom® (EaglePicher Industries, Inc., Inkster, USA) is stirred in prior to filtration through a preheated nutsch filter.

Example 2

Production of an Oil-Based Drilling Fluid

In order to demonstrate the thickening effect of the crosslinked oligoglycerol ester from Example 1, a paraffin oil-based invert drilling fluid was produced, wherein the fluid had the following composition:

| | |
|---|---|
| paraffin oil | 173.6 ml |
| water | 69.3 ml |
| emulsifier | 6 g |
| $CaCl_2 \times 2H_2O$ | 36 g |
| fluid loss additive | 5 g |
| structuring agent | 1 g |
| lime | 1.5 g |
| barite | 314.0 g |

The oil-water ratio was 70:30% by volume. The fluid weight was 14 lb/gal. 4 g (Example 2a) and 8 g (Example 2b) respectively of the crosslinked oligoglycerol ester obtained in Example 1 were additionally added as the thickener. A fluid without additives served as a comparison (comparative example).

The rheological data were measured in all cases in accordance with API bulletin RP 13 B-2. The fluids were examined before aging (before hot rolling=BHR) and after aging at 250° F. (121° C.) (after hot rolling=AHR).

The following conversion factors apply in this regard in the SI system: 1 lbf=4.448 m kg s; 1 lb in=0.015 m kg; 1 gal=3.79 l.

|  | Comparative example | | Example 2a | | Example 2b | |
| --- | --- | --- | --- | --- | --- | --- |
|  | BHR | AHR | BHR | AHR | BHR | AHR |
| Electrical stability at RT [V] | 390 | 526 | 380 | 430 | 410 | 394 |
| PV [cP] | 29 | 27 | 28 | 28 | 30 | 29 |
| YP [lb/100 ft²] | 6 | 9 | 13 | 13 | 17 | 16 |
| Gels 10″/10′[lb/100 ft²] | 5/5 | 5/6 | 6/7 | 7/8 | 8/8 | 8/9 |

The yield point (YP) and gel strength (Gels) were measured after 10 seconds and 10 minutes, and the fluids according to the invention (Examples 2a and 2b) displayed an advantageous thickening compared to the fluid without additives.

In addition to the thickening effect, the lubricant effect of a crosslinked oligoglycerol ester produced from oleic acid:adipic acid:diglycerol at a ratio of 1:0.5:1 was also determined by means of the Almen-Wieland test. For this purpose, the oil-based drilling fluid described hereinbefore was mixed once without lubricant, once with 3% by weight of a conventional lubricant and once with 3% by weight of the crosslinked oligoglycerol ester.

The results may be inferred from FIG. 1. The FIGURE shows that the crosslinked oligoglycerol esters are superior to conventional lubricants.

Example 3

Production of a Water-Based Drilling Fluid

A water-based drilling fluid was produced having the following composition:

| | |
| --- | --- |
| water | 260 g |
| saturated NaCl solution | 260 g |
| bentonite (Aquagel ®[1)] | 36.9 g |
| Na₂CO₃ | 1.9 g |
| NaOH | 3.7 g |
| Quick Thin | 9.2 g |
| Carbonox ®[2)] | 5.5 g |
| PAC-L[3)] | 0.9 g |
| Rev Dust ®[4)] | 92.3 g |
| barite | 329.4 g |

[1)]NL Baroid, Houston, USA
[2)]Halliburton Fluid Systems, Houston, USA
[3)]low-viscosity carboxymethylcellulose from Baroid Drilling Fluids, Houston, USA
[4)]MilWhite Inc., Brownsville, Texas 3% by weight of the crosslinked oligoglycerol ester from Example 1 were furthermore added to this drilling fluid.

The invention claimed is:

1. A crosslinked glycerol or oligoglycerol ester comprising the reaction product of a non-crosslinked glycerol or oligoglycerol ester and a crosslinking agent, wherein the non-crosslinked glycerol or oligoglycerol ester comprises the reaction product of an
(A) acid phase comprising an acid selected from
(a1) a fatty acid, or
(a2) a dicarboxylic acid, or
(a3) a dimeric fatty acid, or
(a4) an oligomeric fatty acid, or
(a5) a hydroxy fatty acid or
(a6) a mixture of at least two thereof,
and an
(B) alcohol phase comprising an alcohol selected from
(b1) monoglycerol, or
(b2) diglycerol, or
(b3) triglycerol, or
(b4) oligoglycerol made up of more than three glycerol units, or
(b5) an alkoxylate of glycerols (b1), (b2), (b3) or (b4), or
(b6) a mixture of at least two thereof,
to form a full or partial ester, and crosslinking the full or partial ester by means of a crosslinking agent, wherein the crosslinking can take place during or after the formation of the full or partial ester,
wherein the crosslinking agent is a compound having at least two functional groups which are capable of reacting with the free OH groups of the partial ester or capable of reacting with functional groups of the acid component used for the production of esters to form a covalent bond.

2. The crosslinked glycerol or oligoglycerol ester according to claim 1, wherein the fatty acid (a1) is a fatty acid comprising a general formula R—COOH, in which R represents a saturated or unsaturated, branched or linear alkyl or alkenyl radical with 7 to 21 C atoms.

3. The crosslinked glycerol or oligoglycerol ester according to claim 2, wherein the fatty acid (a1) is oleic acid, tall oil fatty acid or a mixture of these two fatty acids.

4. The crosslinked glycerol or oligoglycerol ester according to claim 1,
wherein the alcohol phase (B) comprises
(b1) from 5 to 45% by weight of monoglycerol,
(b2) from 15 to 45% by weight of diglycerol,
(b3) from 10 to 40% by weight of triglycerol, and
(b4) from 1 to 40% by weight of oligoglycerol made up of more than three glycerol units,
based on the total weight of the alcohol phase (B) and wherein the total weight of components (b1) to (b4) is 100% by weight.

5. The crosslinked glycerol or oligoglycerol ester according to claim 4, wherein the alcohol phase (B) comprises at least 80% by weight, based on the total weight of the alcohol phase (B), of a glycerol comprising 2 or more glycerol units.

6. The composition according to claim 1, further comprising at least one further component;
wherein the composition is a water-in-oil emulsion.

7. The composition according to claim 6, wherein the water-in-oil emulsion is a nanoemulsion or a microemulsion comprising drops of water or drops of an aqueous phase having a drop size in a range of from 5 nm to 1,000 μm.

8. A method for producing boreholes, in which a drilling fluid is pumped through a borehole comprising the method steps:
(α1) providing a composition according to claim 1, further comprising at least one further component;
(α2) drilling a hole in the ground; and
(α3) introducing the composition provided in method step (α1) at least partly into or in the borehole.

9. The method according to claim 8, wherein the introducing step takes place at least partly during the drilling in method step (α2).

10. The crosslinked glycerol or oligoglycerol ester according to claim 1, wherein the crosslinking agent is a dicarboxylic acid, a dimeric fatty acid, a hydroxycarboxylic acid or a tetraalkoxysilane.

11. A water-in-oil emulsion comprising
  I) from 28.9 to 99% by weight, based on the total weight of the composition, of an organic oil phase which is non-miscible with water,
  II) from 1 to 48% by weight, based on the total weight of the composition, of water or aqueous phase,
  III) from 0.1 to 20% by weight, based on the total weight of the composition, of the crosslinked glycerol or oligoglycerol ester defined in claim 1,
  IV) from 0 to 70% by weight, based on the total weight of the composition, of at least one further additive,
  wherein the sum of components I) to IV) is 100% by weight.

12. The composition according to claim 1, further comprising at least one further component;
  wherein the composition is an aqueous solution.

13. An aqueous solution comprising
  I) from 0 to 48% by weight, based on the total weight of the composition, of an organic oil phase which is non-miscible with water,
  II) from 29.9 to 99.9% by weight, based on the total weight of the composition, of an aqueous phase,
  III) from 0.1 to 20% by weight, based on the total weight of the composition, of a crosslinked glycerol or oligoglycerol ester defined in claim 1,
  IV) from 0 to 70% by weight, based on the total weight of the composition, of at least one further additive,
  wherein the sum of components I) to IV) is 100% by weight.

14. The composition according to claim 1, further comprising at least one further component;
  wherein the at least one further component is an additive selected from the group consisting of thickening agents, clays, liquid loss prevention agents, pH modifiers, viscosity modifiers, filtration control agents, emulsifiers, salts, wetting agents, weighting agents and dispersing agents.

15. A method for producing boreholes, in which a drilling fluid is pumped through a borehole, wherein a composition according to claim 1, further comprising at least one further component;
  is used as said drilling fluid.

16. A method for producing an oil or a gas, including the method steps
  ($\alpha$1) providing a composition according to claim 1, further comprising at least one further component;
  ($\alpha$2) drilling a hole into the ground;
  ($\alpha$3) introducing the composition provided in method step ($\alpha$1) at least partly into or in the borehole;
  ($\alpha$4) extracting oil or gas from the ground through the hole drilled in method step ($\alpha$2);
  ($\alpha$5) optionally purifying or refining the oil or gas extracted in method step ($\alpha$4).

17. A method for producing a crosslinked glycerol or oligoglycerol ester, comprising the method steps
  i) providing an acid phase (A) comprising an acid selected from
    (a1) a fatty acid, or
    (a2) a dicarboxylic acid, or
    (a3) a dimeric fatty acid, or
    (a4) an oligomeric fatty acid, or
    (a5) a hydroxy fatty acid or
    (a6) a mixture of at least two thereof;
  ii) providing an alcohol phase (B) comprising an alcohol selected from
    (b1) monoglycerol, or
    (b2) diglycerol, or
    (b3) triglycerol, or
    (b4) oligoglycerol made up of more than three glycerol units, or
    (b5) an alkoxylate of glycerols (b1), (b2), (b3) or (b4), or
    (b6) a mixture of at least two thereof;
  iii) reacting the acid phase (A) with the alcohol phase (B) to form a full or partial ester; and
  iv) crosslinking the full or partial ester by means of a crosslinking agent,
  wherein the crosslinking can take place during or after the formation of the full or partial ester;
  wherein the crosslinking agent is a compound having at least two functional groups which are capable of reacting with the free OH groups of the partial ester or capable of reacting with functional groups of the acid component used for the production of esters to form a covalent bond.

* * * * *